(12) United States Patent
Thomas

(10) Patent No.: US 10,145,089 B1
(45) Date of Patent: Dec. 4, 2018

(54) WATER CONDUIT FLOW INDICATOR

(71) Applicant: John Thomas, Lula, GA (US)

(72) Inventor: John Thomas, Lula, GA (US)

( * ) Notice: Subject to any disclaimer, the term of this patent is extended or adjusted under 35 U.S.C. 154(b) by 182 days.

(21) Appl. No.: 15/370,147

(22) Filed: Dec. 6, 2016

(51) Int. Cl.
| | |
|---|---|
| *E03B 7/07* | (2006.01) |
| *G01F 1/11* | (2006.01) |
| *G01P 13/00* | (2006.01) |
| *G08B 3/02* | (2006.01) |

(52) U.S. Cl.
CPC ............ *E03B 7/071* (2013.01); *G01F 1/11* (2013.01); *G01P 13/004* (2013.01); *G08B 3/02* (2013.01)

(58) Field of Classification Search
CPC ..... G01F 1/05; G01F 1/07; G01F 1/10; G01F 1/11; G01P 13/00; G08B 3/02; G08B 3/06; E03B 7/07; E03B 7/071
USPC ....... 116/112, 264, 265, 266, 268, 271, 272, 116/273, 274, 275; 73/861.88, 861.93
See application file for complete search history.

(56) References Cited

U.S. PATENT DOCUMENTS

| | | | | |
|---|---|---|---|---|
| 330,267 | A * | 11/1885 | Smith | F17D 5/02 48/193 |
| 1,857,627 | A | 5/1932 | Elder | |
| 2,347,305 | A * | 4/1944 | Walker | G01P 13/004 116/274 |
| 2,681,031 | A * | 6/1954 | McGillis et al. | G01P 13/004 116/112 |
| 3,097,762 | A | 7/1963 | Charnota | |
| 3,187,943 | A | 6/1965 | Wolf | |
| 3,993,017 | A * | 11/1976 | De Brey | A47L 9/19 116/112 |
| 4,461,174 | A * | 7/1984 | Han | G01F 1/07 73/275 |
| 6,012,339 | A * | 1/2000 | Genack et al. | G01F 1/075 73/861.77 |
| 6,129,265 | A * | 10/2000 | Perryman et al. | B65D 5/42 116/2 |
| 6,708,722 | B1 | 3/2004 | Goodenough | |
| D499,794 | S | 12/2004 | Corner | |
| 2,793,075 | A1 | 9/2011 | Ritter | |
| 2012/0223153 | A1 | 9/2012 | Helmsderfer | |
| 2015/0317895 | A1 | 11/2015 | Azizgolshani | |

(Continued)

FOREIGN PATENT DOCUMENTS

| | | | | |
|---|---|---|---|---|
| EP | 1367370 | A1 | 12/2003 | |
| GB | 807173 | A * | 1/1959 | G01P 13/004 |

(Continued)

*Primary Examiner* — R. A. Smith

(57) ABSTRACT

The water conduit flow indicator is a device that is configured to be installed between a spigot and a water conduit in order to provide an audible alarm that water fluid is flowing through the device. The water conduit flow indicator is further defined with a housing that features an inlet and an outlet. The housing includes an internal partition that separates a fluid side from a dry side. Located within the housing is a pair of impeller blades. The pair of impeller blades is further defined with a fluid impeller blade and a dry impeller blade. The dry side of the housing includes a ringer bell that comes into contact with the dry impeller blade such that as the dry impeller blade rotates, the ringer bell generates an audible noise that alerts an end user as to the fluid flow occurring through the water conduit flow indicator.

10 Claims, 4 Drawing Sheets

(56) References Cited

U.S. PATENT DOCUMENTS

2016/0086471 A1* 3/2016 Goldschmidt et al. ..................... G08B 21/14
340/610

FOREIGN PATENT DOCUMENTS

| JP | 3150324 U | * | 5/2009 | ............. | G01P 13/00 |
| KR | 20110129176 A | * | 12/2011 | ............. | G01F 15/00 |

* cited by examiner

WATER CONDUIT FLOW INDICATOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of water conduits, more specifically, a device that indicates fluid flow via a ringing noise that is generated upon fluid flowing through the device and into a water conduit, such as a garden hose.

Water spigots and garden hoses are a staple of most households. When someone is outdoors watering the yard, he or she may become distracted and forget to turn off the water that is flowing from the spigot through the garden hose. This results in wasted water, and can cause damage to the property.

What is needed is a device that connects in-line between the spigot and the hose, and which generates an audible noise when water is flowing through the device. The audible noise acts as an alarm to alert the end user that water is being used so as to prevent waste of water should the end user no longer require running water. The audible noise helps to prevent an end user from simply forgetting that he or she turned on the water at the spigot, and that he or she should go and turn off the water at the spigot.

SUMMARY OF INVENTION

The water conduit flow indicator is a device that is configured to be installed between a spigot and a water conduit in order to provide an audible alarm that water fluid is flowing through the device. The water conduit flow indicator is further defined with a housing that features an inlet and an outlet. The housing includes an internal partition that separates a fluid side from a dry side. The fluid side enables water fluid flow to extend from the inlet to the outlet. Located within the housing is a pair of impeller blades. The pair of impeller blades is further defined with a fluid impeller blade and a dry impeller blade. As water fluid flow occurs within the fluid side of the housing, the fluid impeller blade rotates. The dry impeller blade is affixed to the fluid impeller blade such that the pair of impeller blades move in unison. The partition includes a watertight seal where the pair of impeller blades extends from the fluid side to the dry side of the housing. The dry side of the housing includes a ringer bell that comes into contact with the dry impeller blade such that as the dry impeller blade rotates, the ringer bell generates an audible noise that alerts an end user as to the fluid flow occurring through the water conduit flow indicator.

It is an object of the invention to provide a device that reminds an end user that water is flowing from a water source, through the device, and out into an applicable water conduit so that the end user will not forget that water is running thereby preventing wasted water and/or possible damage to the property.

These together with additional objects, features and advantages of the water conduit flow indicator will be readily apparent to those of ordinary skill in the art upon reading the following detailed description of the presently preferred, but nonetheless illustrative, embodiments when taken in conjunction with the accompanying drawings.

In this respect, before explaining the current embodiments of the water conduit flow indicator in detail, it is to be understood that the water conduit flow indicator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the water conduit flow indicator.

It is therefore important that the claims be regarded as including such equivalent construction insofar as they do not depart from the spirit and scope of the water conduit flow indicator. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
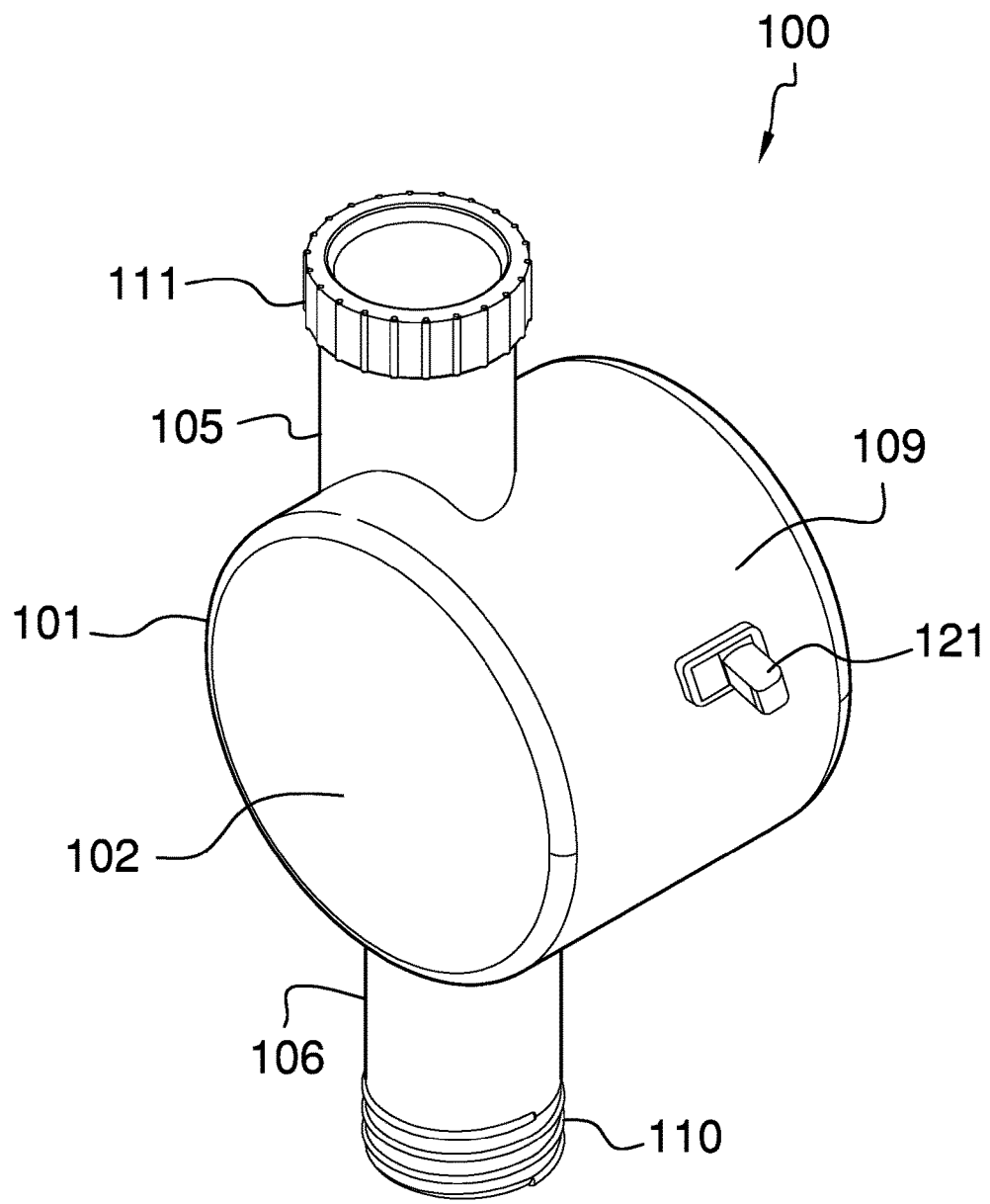
FIG. 1 is a perspective view of an embodiment of the disclosure.
Figure 2:
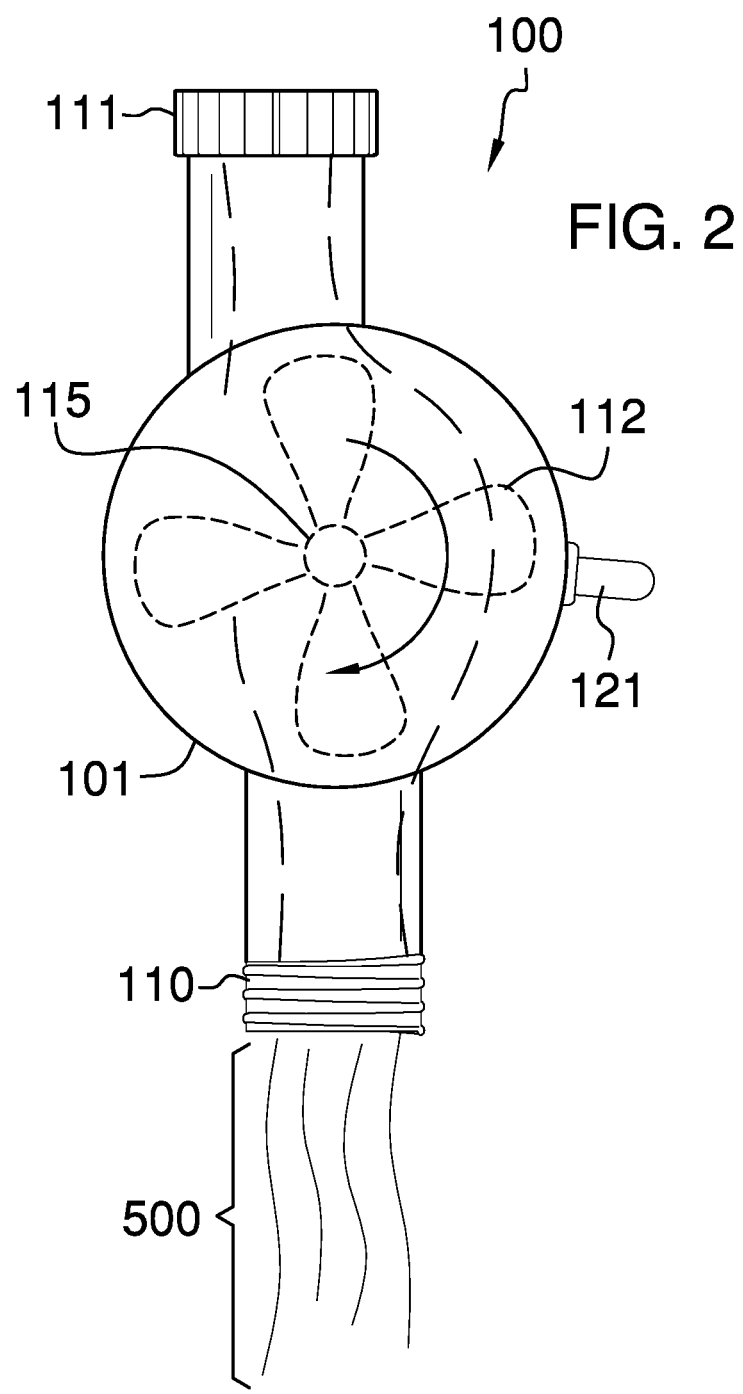
FIG. 2 is a front view of an embodiment of the disclosure.
Figure 3:
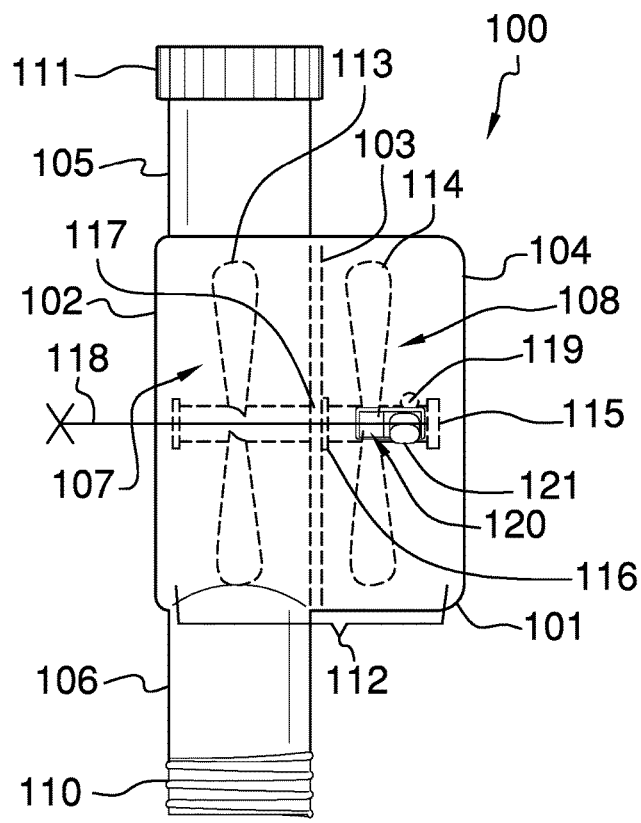
FIG. 3 is a side view of an embodiment of the disclosure.
Figure 4:
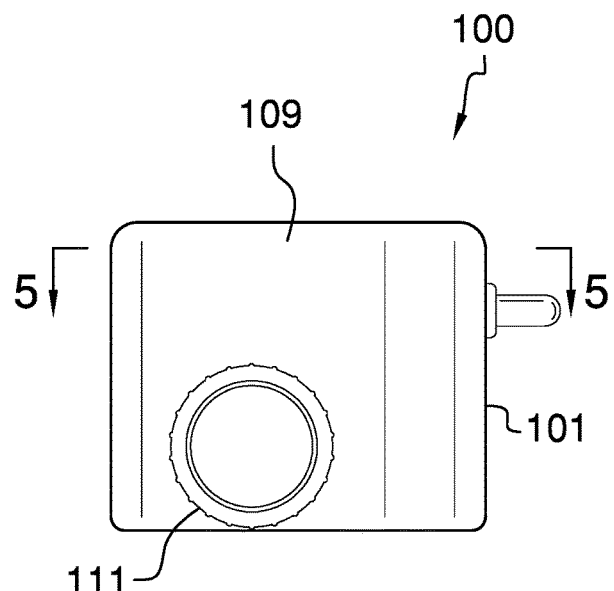
FIG. 4 is a top view of an embodiment of the disclosure.
Figure 5:
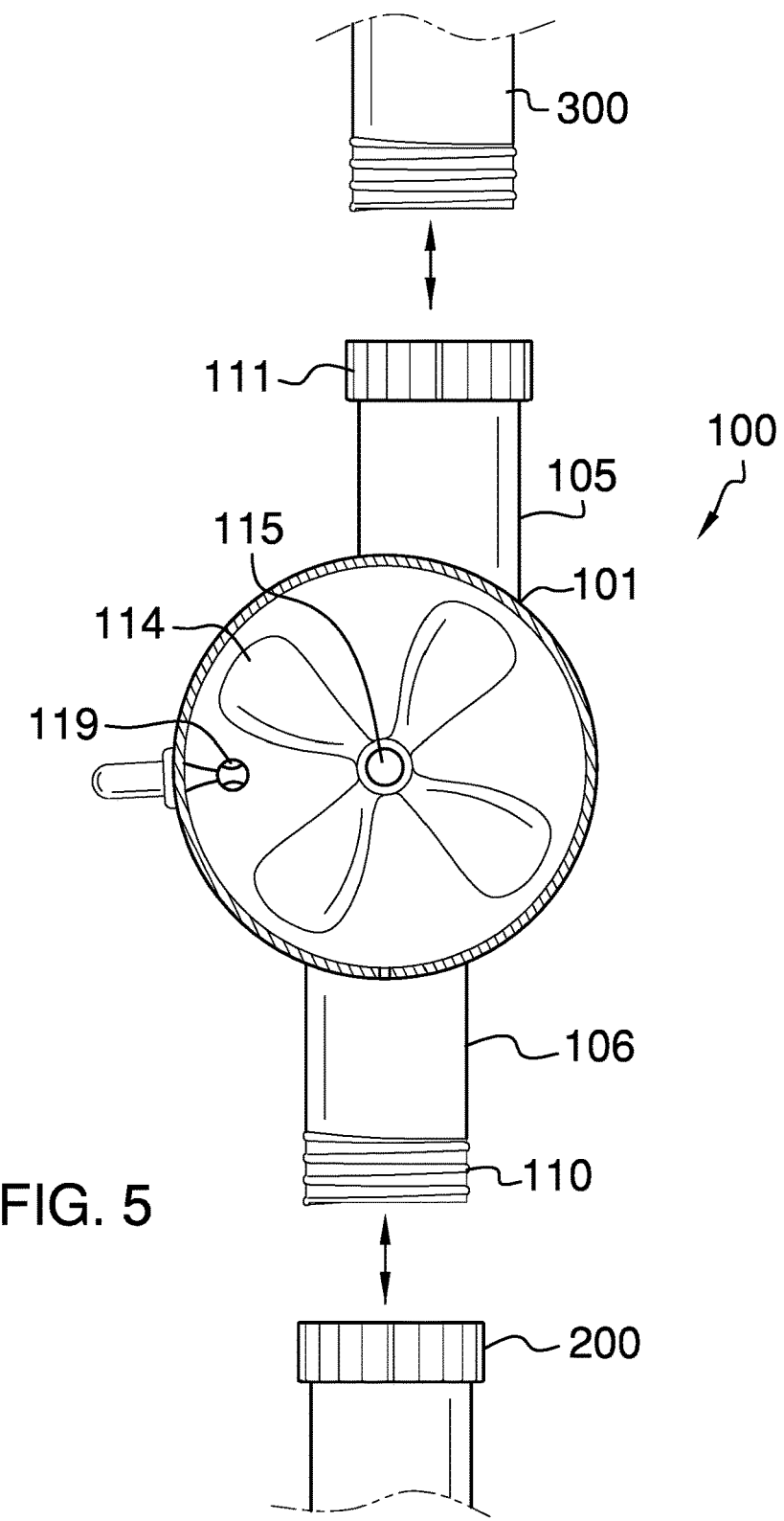
FIG. 5 is a cross-sectional view of an embodiment of the disclosure along line 5-5 in FIG. 4.

Detailed reference will now be made to one or more potential embodiments of the disclosure, which are illustrated in FIGS. 1 through 5.

The water conduit flow indicator 100 (hereinafter invention) includes a housing 101. The housing 101 is generally cylindrical in shape, and is of hollowed construction. The housing is further defined with a first planar surface 102, a partition 103, and a second planar surface 104. The housing 101 includes an inlet 105 and an outlet 106.

Looking to the interior of the housing 101, the partition 103 separates a fluid side 107 from a dry side 108. The outlet 106 and the inlet 105 are in fluid connection with the fluid side 107 of the housing 101. Moreover, the outlet 106 is positioned on an opposing side of a perimeter surface 109 of the housing 101 with respect to the inlet 105.

The outlet 106 features external threading 110, which is configured to interface with a female connection 201 of a water conduit 200. It shall be noted that the term water conduit 200 is being used to refer to a garden hose, but may not be limited to a garden hose. The invention 100 does not require the use of the water conduit 200 to operate. In fact, the invention 100 can work without the water conduit 200, and still generate an audible noise.

The inlet 105 includes a rotating threaded connection 111 that is configured to interface with a water source 300. It shall be noted that the term water source 300 is being used to loosely refer to a water spigot, but may be modified for connectivity with different types of water sources.

As previously mentioned, the inlet 105 is in fluid communication with the outlet 106 via the fluid side 107 of the housing 101. It shall be noted that the fluid side 107 has a shape similar to the dry side 108. The partition 103 has a circular shape, and separates the fluid side 107 from the dry side 108. Both the fluid side 107 and the dry side 108 have a cylindrical shape.

Located within the housing 101 is a pair of impeller blades 112. The pair of impeller blades 112 can be distinguished with a fluid impeller blade 113 and a dry impeller blade 114. The fluid impeller blade 113 is affixed to the dry impeller blade 114 via a blade shaft 115. The pair of impeller blades 112 extend across the partition 103. In fact, a partition gasket 116 is provided at the location of the partition 103 where the blade shaft 115 extends across the partition 103. This is to imply that the partition 103 includes a shaft opening 117 where the blade shaft 115 extends across.

The pair of impeller blades 112 rotate about a first axis 118 that is concentric with the blade shaft 115. The fluid impeller blade 113 rotates within the fluid side 107 of the housing 101 while the dry impeller blade 114 rotates within the dry side 108 of the housing 101. The fluid impeller blade 113 is attached to and rotates in concert with the dry impeller blade 114. It shall be noted that the fluid impeller blade 113 has at least one blade. It shall be further noted that the dry impeller blade 114 has at least one blade.

As water 500 flows through the fluid side 107 of the housing 101, both the fluid impeller blade 113 and the dry impeller blade 114 rotate. The dry side of the housing 108 includes a ringer bell 119. The ringer bell 119 is able to come into contact with the dry impeller blade 114 in order to generate the ringing noise, which is the whole reason for the invention 100. The dry impeller blade 114 strikes the ringer bell 119, which generates an audible noise that exits the dry side 108 of the housing 101 in order to provide notice to an end user that water is flowing through the invention 100.

The perimeter surface 109 of the housing 101 includes a noise outlet 120 that is provided adjacent to the ringer bell 119 and the dry side 108 of the housing 101. The noise outlet 120 enables noise from the ringer bell 119 to exit the housing 101. The ringer bell 119 is also affixed to a decibel control switch 121 that regulates the amount of noise generated between the ringer bell 119 and the dry impeller blade 114. Simply put, the decibel control switch 121 is a sliding mechanism provided on the noise outlet 120 of the housing 101, which slides the ringer bell 119 back and forth with respect to where the dry impeller blade 114 rotates inside of the dry side 108 of the housing 101.

It shall be noted that there are a plurality of different noise-generating mechanisms that may be substituted for the ringer bell 119. A clapper bell configuration may be used as a substitute for the ringer bell 119. Clapper bells typically have a shaft and a pivot point, which implies that the clapper bell would be required to bang against the interior of the housing 101 in order to generate the noise required of the invention 100. Regardless of the type of bell used within the housing 101, the housing 101 needs to be constructed of a material that can handle fluid pressure as well as being a good material for generating or echoing noises. It would be ideal to make the housing 101 out of a metal. However, other materials that may be used include plastics, ceramics, carbon fiber composites, etc.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A device for indicating fluid flow to a conduit comprising:
    a housing whereby fluid flow streaming through said housing interfaces with a noise-generating member so as to provide an audible noise that signifies that fluid flow is occurring;
    wherein the housing is generally cylindrical in shape, and is of hollowed construction;
    wherein the housing is further defined with a first planar surface, a partition, and a second planar surface;
    wherein the housing includes an inlet and an outlet;
    wherein a partition separates the interior of the housing into a fluid side and a dry side;
    wherein the outlet and the inlet are in fluid connection with the fluid side of the housing;
    wherein the outlet is positioned on an opposing side of a perimeter surface of the housing with respect to the inlet;
    wherein the inlet includes a rotating threaded connection that is configured to interface with a water source;
    wherein the inlet is in fluid communication with the outlet via the fluid side of the housing;
    wherein the fluid side has a shape similar to the dry side;
    wherein the partition has a circular shape, and separates the fluid side from the dry side;
    wherein both the fluid side and the dry side have a cylindrical shape;
    wherein located within the housing is a pair of impeller blades;

wherein the pair of impeller blades is further defined as a fluid impeller blade and a dry impeller blade.

2. The device for indicating fluid flow to a conduit according to claim 1 wherein the outlet features external threading, which is configured to interface with a female connection of a water conduit.

3. The device for indicating fluid flow to a conduit according to claim 1 wherein the fluid impeller blade is affixed to the dry impeller blade via a blade shaft; wherein the pair of impeller blades extend across the partition.

4. The device for indicating fluid flow to a conduit according to claim 3 wherein a partition gasket is provided at the location of the partition where the blade shaft extends across the partition; wherein the partition includes a shaft opening where the blade shaft extends across.

5. The device for indicating fluid flow to a conduit according to claim 4 wherein the pair of impeller blades rotate about a first axis that is concentric with the blade shaft.

6. The device for indicating fluid flow to a conduit according to claim 5 wherein the fluid impeller blade rotates within the fluid side of the housing while the dry impeller blade rotates within the dry side of the housing.

7. The device for indicating fluid flow to a conduit according to claim 6 wherein the fluid impeller blade is attached to and rotates in concert with the dry impeller blade.

8. The device for indicating fluid flow to a conduit according to claim 7 wherein as water flows through the fluid side of the housing, both the fluid impeller blade and the dry impeller blade rotate.

9. The device for indicating fluid flow to a conduit according to claim 8 wherein the dry side of the housing includes a ringer bell; wherein the ringer bell is the noise-generating member; wherein the ringer bell is able to come into contact with the dry impeller blade in order to generate ringing noise; wherein the dry impeller blade strikes the ringer bell, which generates an audible noise that exits the dry side of the housing in order to provide notice as to water flowing through the housing.

10. The device for indicating fluid flow to a conduit according to claim 9 wherein the perimeter surface of the housing includes a noise outlet that is provided adjacent to the ringer bell and the dry side of the housing; wherein the noise outlet enables noise from the ringer bell to exit the housing; wherein the ringer bell is also affixed to a decibel control switch that regulates the amount of noise generated between the ringer bell and the dry impeller blade; wherein the decibel control switch is a sliding mechanism provided on the noise outlet of the housing, which slides the ringer bell back and forth with respect to where the dry impeller blade rotates inside of the dry side of the housing.

* * * * *